United States Patent [19]

Scenna et al.

[11] Patent Number: 5,894,302

[45] Date of Patent: Apr. 13, 1999

[54] ERGONOMIC HOUSING FOR A COMPUTER MOUSE

[75] Inventors: Leslie Scenna, Amherst, N.H.; Steven Wang, Andover, Mass.

[73] Assignee: Contour Design, Inc., Salem, N.H.

[21] Appl. No.: 08/520,866

[22] Filed: Aug. 28, 1995

[51] Int. Cl.⁶ .................................................. G09G 5/08
[52] U.S. Cl. .......................................... 345/163; 345/156
[58] Field of Search ................................. 345/155, 157, 345/163, 164, 167; 248/118, 118.1, 118.2, 118.3; D14/114

[56] References Cited

U.S. PATENT DOCUMENTS

| | | | |
|---|---|---|---|
| D. 302,426 | 7/1989 | Bradley et al. | D14/114 |
| D. 306,017 | 2/1990 | Shulman et al. | D14/114 |
| D. 314,194 | 1/1991 | Norris | D14/114 |
| D. 326,848 | 6/1992 | Shiraishi | D14/114 |
| D. 328,597 | 8/1992 | Clouss | D14/114 |
| D. 337,321 | 7/1993 | Koh et al. | D14/114 |
| D. 349,280 | 8/1994 | Kaneko | D14/114 |
| D. 354,746 | 1/1995 | Colani et al. | D14/114 |
| D. 356,558 | 3/1995 | Montgomery et al. | D14/114 |
| D. 362,431 | 9/1995 | Kaneko et al. | D14/114 |
| 4,862,165 | 8/1989 | Gart | 341/20 |
| 5,157,381 | 10/1992 | Cheng | 345/163 |
| 5,203,845 | 4/1993 | Moore | 248/118 |
| 5,287,090 | 2/1994 | Grant | 345/163 |
| 5,340,067 | 8/1994 | Martin et al. | 248/118.5 |
| 5,414,445 | 5/1995 | Kaneko et al. | 345/163 |
| 5,473,344 | 12/1995 | Bacon et al. | 345/163 |
| 5,576,733 | 11/1996 | Lo | 345/163 |

OTHER PUBLICATIONS

E.Y. Chao et al., "Three-Dimensional Force Analysis of Finger Joints in Selected Isometric Hand Functions", pp. 387–396, received Aug. 12, 1975.

T.J. Armstrong, et al., "Some Biomechanical Aspects of the Carpal Tunnel", pp. 567–570, received Nov. 19, 1978.

D.A. Ranney et al., "Lumbrical function: Interaction of lumbrical contraction with the elasticity of the extrinsic finger muscles and its effect on metacarpophalangeal equilibrium", *The Journal of Hand Surgery*, pp. 566–574, vol. 12, No. 4, Jul. 1987.

D. Greenwald et al., "Dynamic Analysis of Profundus Tendon Function", *The Journal of Hand Surgery*, pp. 626–635, vol. 19A, No. 4, Jul., 1994.

M. Hagberg, Handout—International Conference on Occupational Disorders of the Upper Extremity, "Symptoms and disorders related to keyboard and computer mouse use", pp. 1–6, Oct. 6, 1994.

R.M. Szabo et al., "Median Nerve Displacement Through the Carpal Canal", *The Journal of Hand Surgery*, pp. 901–906, vol. 19A, No. 6, Nov., 1994.

*Primary Examiner*—Steven J. Saras
*Assistant Examiner*—Xu-Ming Wu
*Attorney, Agent, or Firm*—Weingarten, Schurgin, Gagnebin & Hayes LLP

[57] ABSTRACT

An ergonomic housing for a computer mouse helpful in minimizing the occurrence and alleviating the symptoms of repetitive strain injuries is disclosed. The mouse housing includes a palm support area having a hump which is an asymmetrically skewed bulge about with a user's hand may pivot. The palm support area also includes a tapered tail for supporting the hand and wrist off the surface. The housing includes at least one button which is elevated and angled to minimize flexion of and accompanying stress on the tendons of the finger. A thumb support is also provided to allow the thumb to rest off the surface and to aid in lifting the mouse.

23 Claims, 23 Drawing Sheets

SECTION A-A

SECTION B-B

SECTION C-C

SECTION D-D

ERGONOMIC HOUSING FOR A COMPUTER MOUSE

FIELD OF THE INVENTION

This invention relates to ergonomic devices and more particularly to ergonomic computer input devices.

BACKGROUND OF THE INVENTION

Computer mice are a type of computer input device used to input data and control cursor movement on a computer screen. The mouse includes a roller ball mechanism protruding from the base of the housing. A user grasps the housing of the mouse to roll the ball over a flat surface, from which changes in positional data can be determined. The mouse also includes at least one button on the top of the housing which the user can depress to activate various functions. A number of companies, such as Microsoft Corporation, Logitech Inc., Assmann, and Sicos, manufacture mice which are readily available and in wide use.

Symptoms of repetitive strain injuries in the neck, shoulder, forearm, and wrist have been related to the increased use of the computer mouse. Repetitive strain injury (RSI), also known as repetitive motion disorder or cumulative trauma disorder, is an umbrella term which covers a number of similar conditions arising from overuse of the joints or soft tissues of the upper extremities. Factors leading to upper extremity RSIs are stressful, highly forceful, and/or highly repetitive arm and hand movements and positions, including ordinary movements such as gripping and reaching. These movements may become hazardous if they are repeated forcefully or awkwardly without a sufficient rest to allow recovery.

In case histories, specific musculoskeletal diseases have been linked to the mouse. Carpal tunnel syndrome, finger extensor tendinitis, and neck/shoulder myofascial pain are some of the diagnoses referred to in the reports from physical therapists and physicians in occupational health care. Hagberg, M., et al, "Symptoms and disorders related to keyboard and computer mouse use," Handout, *International Conference on Occupational Disorders of the Upper Extremity*, ver. 1.0, Oct. 6, 1994.

Carpal tunnel syndrome (CTS) is the most frequently encountered peripheral compression neuropathy. The carpal tunnel is bordered posteriorly by the carpal bones of the wrist and anteriorly by the inelastic flexor retinaculum, also known as the transverse carpal ligament. Ten structures traverse the carpal tunnel: four tendons of the flexor digitorum superficialis (FDS), four tendons of the flexor digitorum profundus (FDP), the tendon of the flexor pollicis longus, and the median nerve. CTS is usually gradual in onset, sometimes presenting first in a single finger and later spreading to the rest of the distribution of the median nerve.

CTS has classically been considered a nerve compression injury. Although most cases of CTS are idiopathic, a wide variety of conditions may predispose a person to CTS. A rise in carpal tunnel pressure is believed to be the direct cause of median nerve compression in CTS. Non-specific synovial proliferation within the carpal tunnel is the most common cause. It is known to be aggravated by extrinsic dynamic factors, such as activities requiring prolonged wrist flexion or repeated wrist or finger flexion and power grip. Movement of the intrinsic lumbrical muscles into the carpal tunnel during finger flexion may also affect the carpal tunnel pressure. Armstrong, T. J. et al., "Some Biomechanical Aspects of the Carpal Tunnel," 1978; Ranny, D. A. et al., "Lumbrical Function: Interaction of lumbrical contraction with the elasticity of the extrinsic finger muscles and its effect on metacarpophalangeal equilibrium," *The Journal of Hand Surgery*, Vol. 12A, No. 4, Jul., 1987, pp. 566–574. Furthermore, due to its interposed position between the anterior row of tendons and the transverse carpal ligament, the median nerve is subject to shearing and compression as flexor tendons are displaced. Recent research indicates that the flexor tendons consistently translocate at two to three times the rate of the median nerve and the median nerve experiences proximally directed, frictional shear forces exerted by the adjacent tendons. Szabo, R., et al, "Median Nerve Displacement Through the Carpal Canal," *The Journal of Hand Surgery*, Vol. 19A, No., 6, November 1994, pp. 901–906.

Many of the prior art mouse designs require or encourage the user to apply primarily a finger tip pinch to operate the mouse button. The finger tip applies force against the mouse button in a finely controlled manner. With this action, the finger flexes at all three joints and contacts the mouse button only at the finger tip. In an active pinch action, the FDP tendon carries most of the strength. Chao, E. Y., "Three-Dimensional Force Analysis of Finger Joints In Selected Isometric Hand Functions," 1975. Also, the larger and more rounded contour with a tilted or sloped palm support may have a tendency of "locking" the hand into a rigid holding posture, which does not allow easy shifting or movement away from the suggested hand posture. Maintaining the hand in a single posture increases the static loading of the muscles. See, for example, the prior art mice illustrated in FIGS. 23A, 23B, 24A, 24B, 25A, and 25B.

SUMMARY OF THE INVENTION

The present invention provides a computer mouse that reduces the likelihood of the occurrence of carpal tunnel syndrome by a user and that can be used with reduced distress by users who already suffer from carpal tunnel syndrome.

The mouse housing includes a palm support area having a hump and a tail. The hump is a raised area asymmetrically placed on the housing to be generally situated near the top of the central triangular area of the palm. The user's hand is able to pivot about the hump. The tail is a ramp-like region extending from the back end of the housing up to the hump. The tail supports the region of the palm where the thenar and hyperthenar converge and tends to limit side-to-side movement of the wrist, thereby encouraging greater use of the forearm muscles.

The housing includes at least one mouse button. The base of the button is higher than the hump when the housing is supported on a level surface. The length and angle of the button maintain the user's finger with a lesser degree of flexion of the FDP tendon, which minimizes stress on the tendon.

A thumb support is also provided to rest the thumb off the surface and to aid in lifting the mouse. The thumb support includes a lower support for resting the thumb and an upper support for lifting the mouse. The thumb support may also be removable and may be adjustable along the length of the mouse housing to accommodate thumbs of different sizes.

Additionally, the mouse housing may be provided in different sizes to accommodate hands of different sizes.

DESCRIPTION OF THE DRAWINGS

The invention will be more fully understood from the following detailed description taken in conjunction with the accompanying drawings in which.

DETAILED DESCRIPTION OF THE INVENTION

Figure 14:
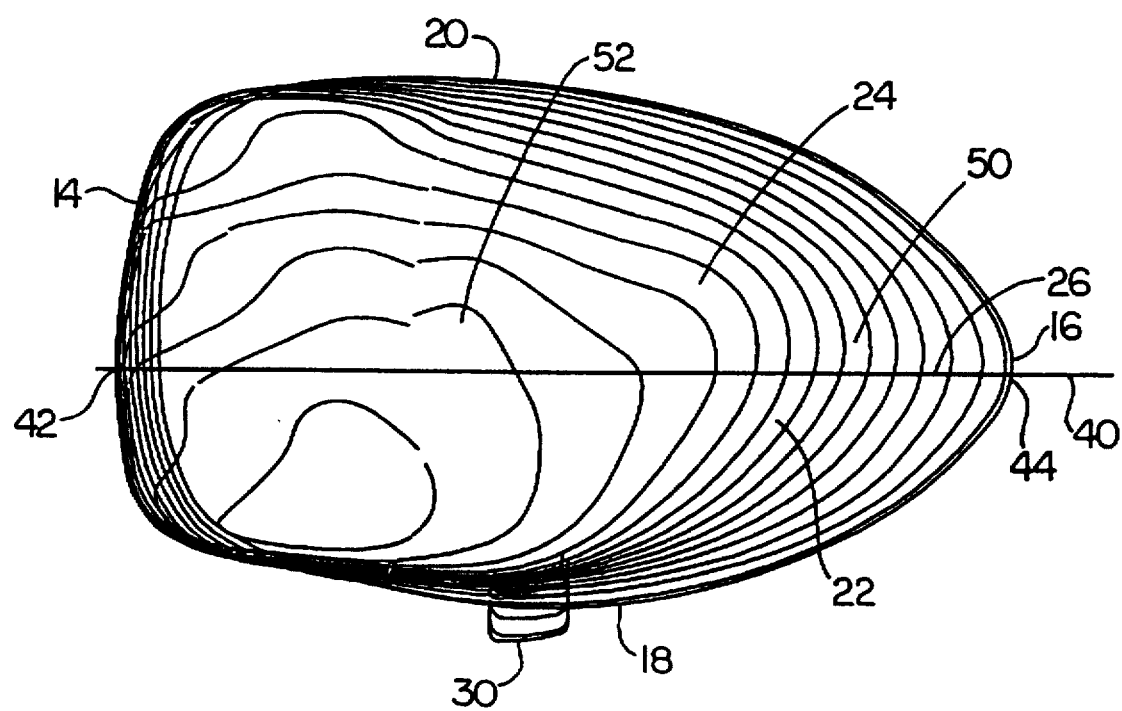
FIG. 14 is a top plan view of the mouse housing of FIG. 13 showing elevation contours at intervals of ⅛"

A mouse according to the invention is shown generally in FIGS. 1 through 7. The mouse comprises an asymmetrical housing or shell 12 having a front 14 and a back 16, an inner side 18 against which the thumb lies, and an outer side 20 against which the little finger lies. The housing includes a palm support area 22 having a hump 24 and a tail 26, at least one finger button 28, and a thumb support 30. Any suitable sensing mechanism (not shown), as is known in the art, may be provided inside the housing 12. FIG. 14 illustrates a suitable configuration in the form of a contour plot showing lines of equal elevation with respect to a level work surface on which the housing is supported.

Figure 15:
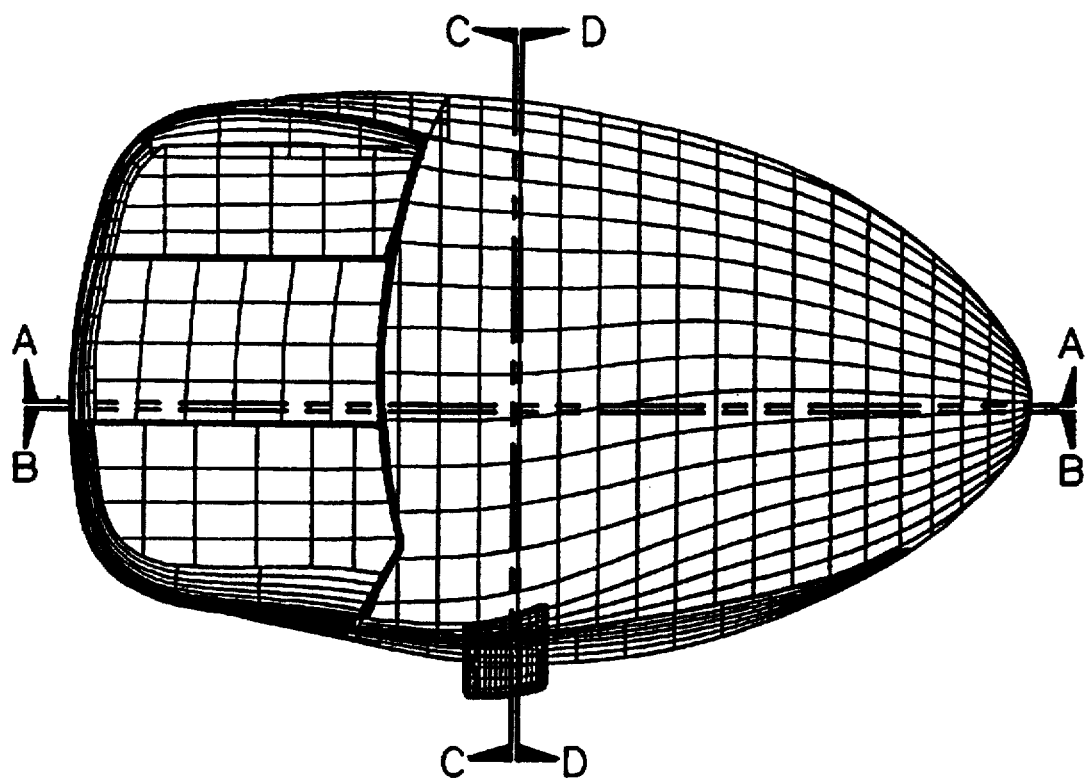
FIG. 15 is a further top plan view of the mouse housing of FIG. 13.
Figure 20:
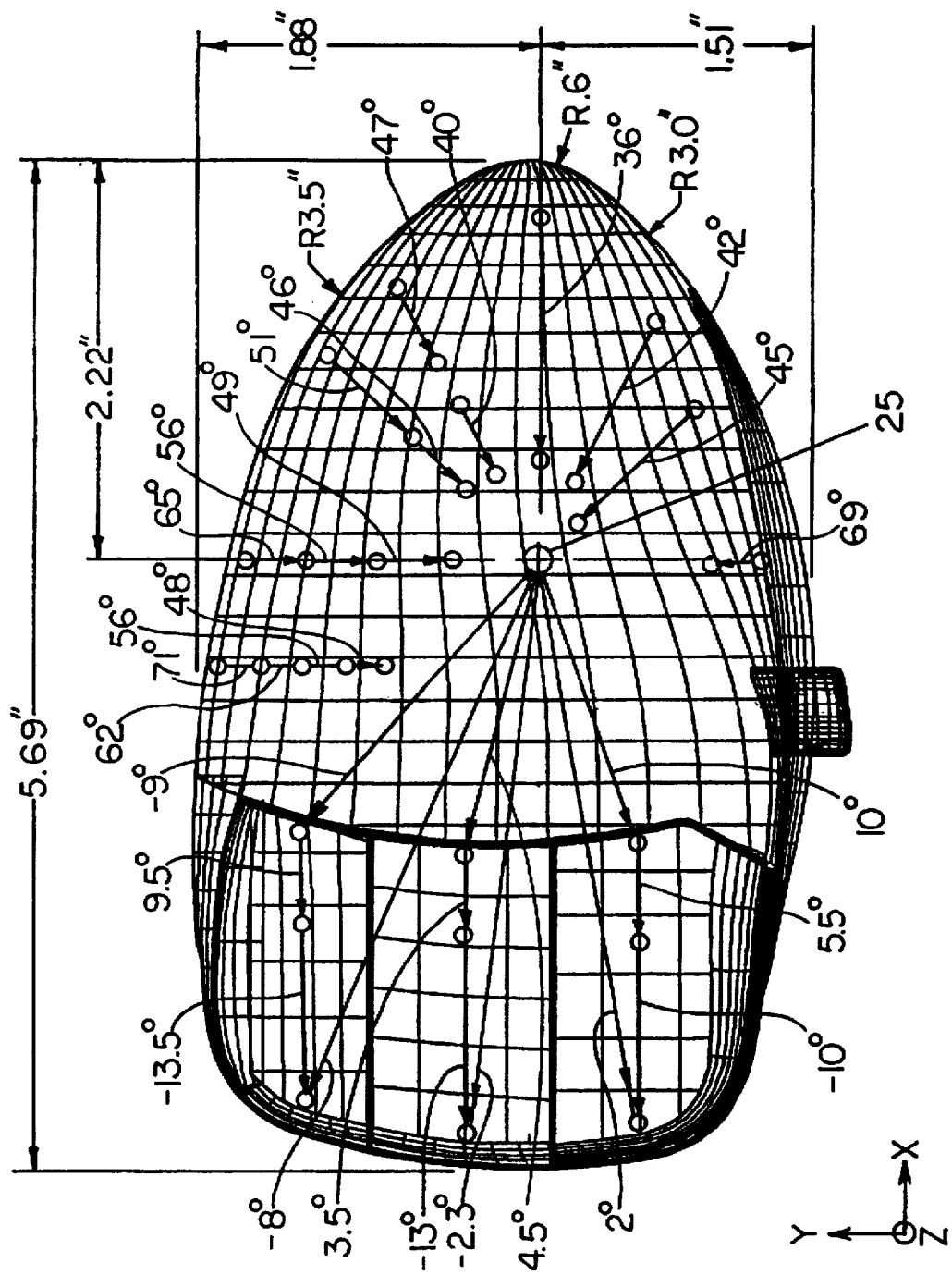
FIG. 20 is a top plan view illustrating the slope of the mouse housing of FIG. 15 at various locations.
Figure 21:
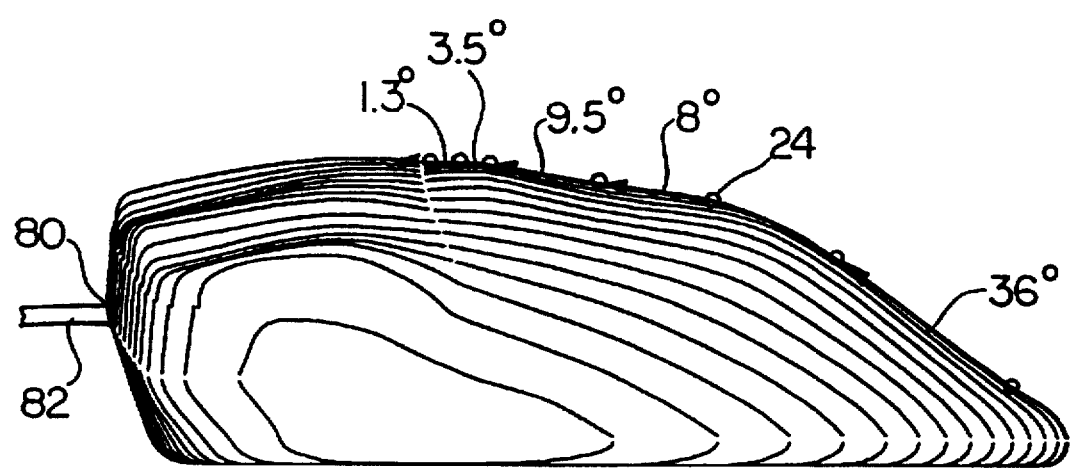
FIG. 21 is a sectional side view taken along line A—A of FIG. 15 also illustrating the slope of the mouse housing at various locations.
Figure 22:
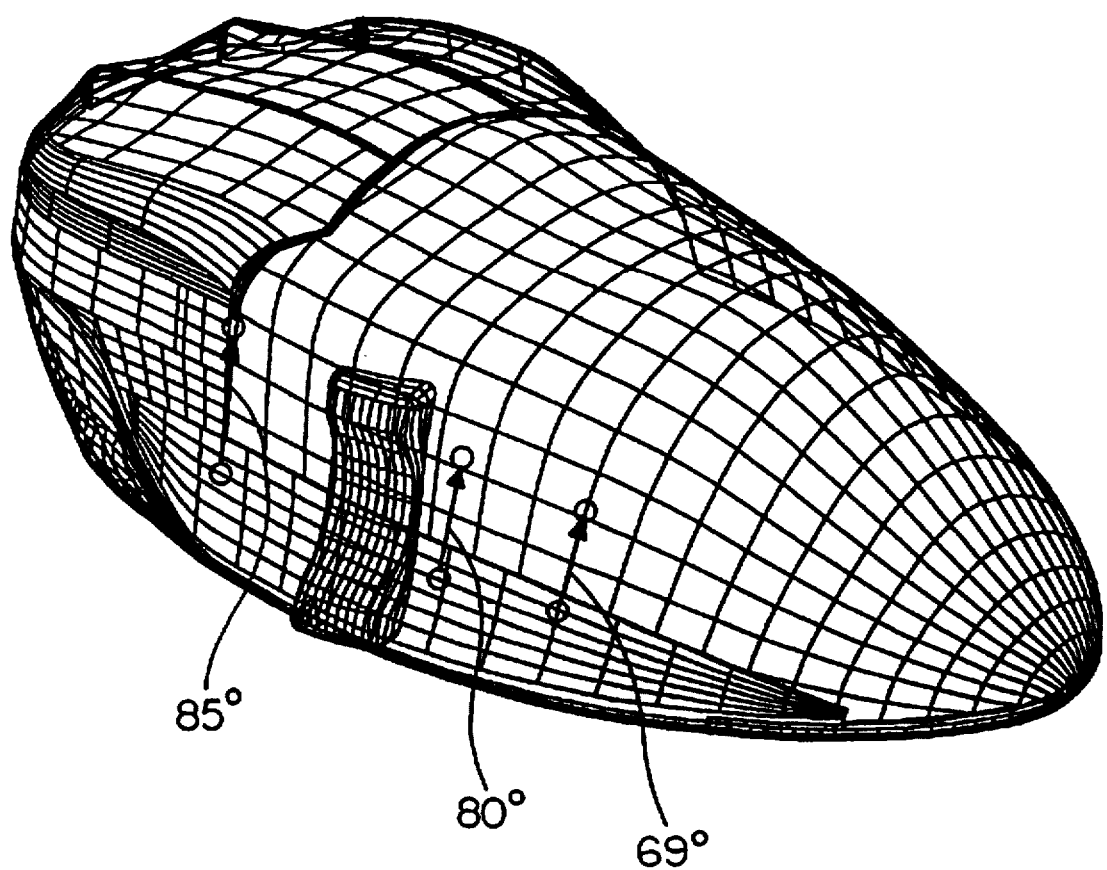
FIG. 22 is an isometric view further illustrating the slope of the mouse housing of FIG. 15 at various locations.
Figure 23A:
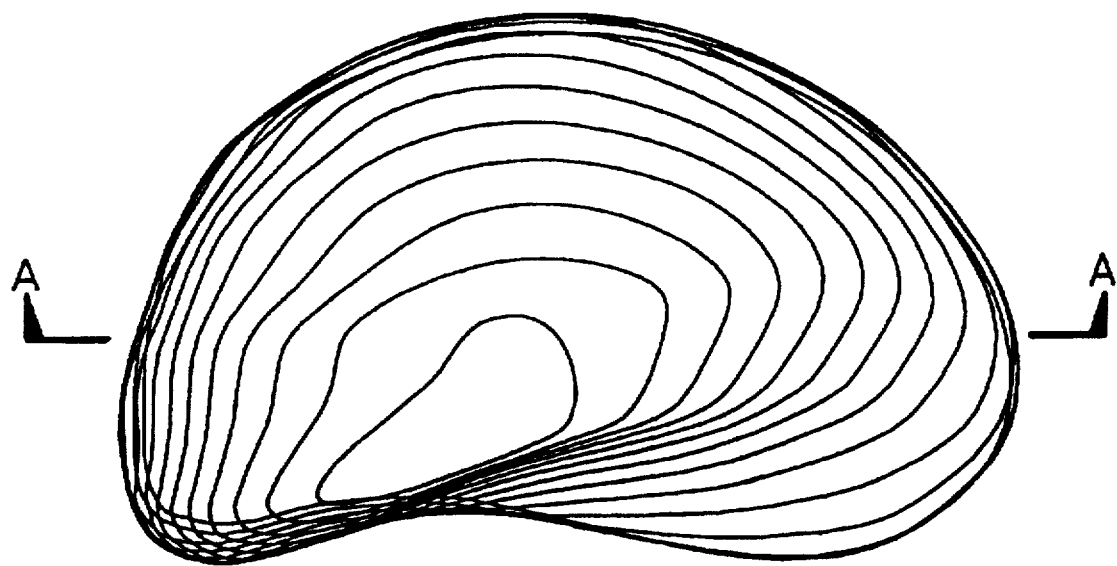
FIG. 23A is a plan view of a prior art mouse of Sicos illustrating elevational contour lines at intervals of ⅛"
Figure 23B:
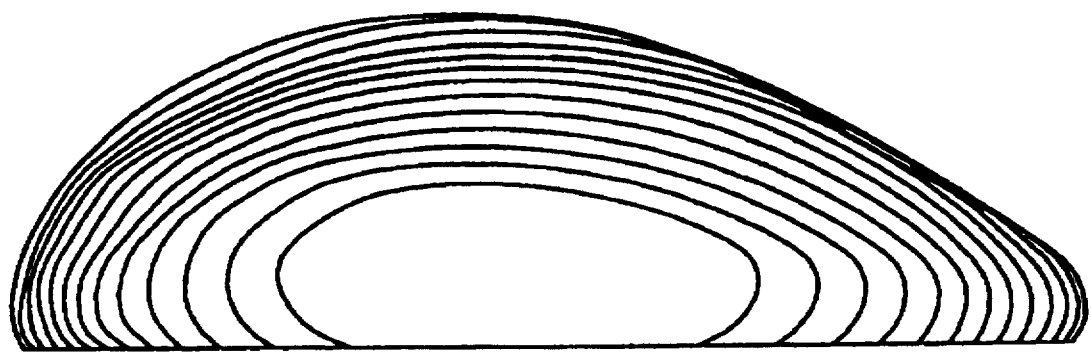
FIG. 23B is a cross-sectional view along line A—A of FIG. 23A showing equally spaced section lines taken every ⅛"
Figure 24A:
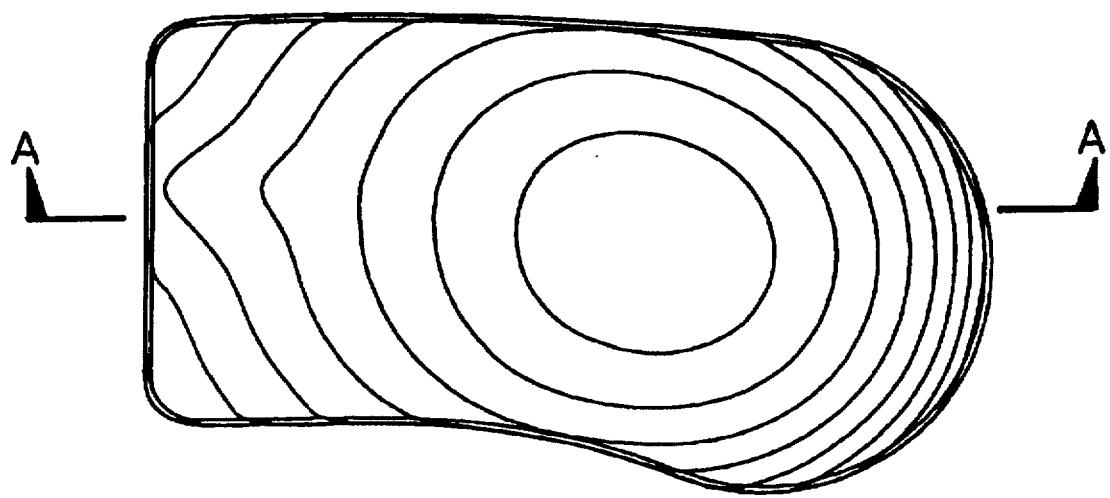
FIG. 24A is a plan view of a prior art mouse of Microsoft Corporation, V2.0, illustrating elevational contour lines at intervals of ⅛"
Figure 24B:
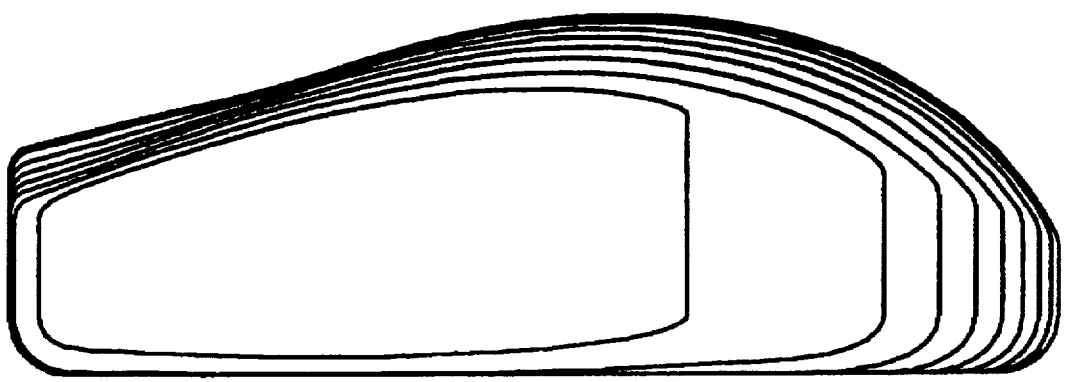
FIG. 24B is a cross-sectional view along line A—A of FIG. 24A showing equally spaced section lines taken every ⅛"
Figure 25A:
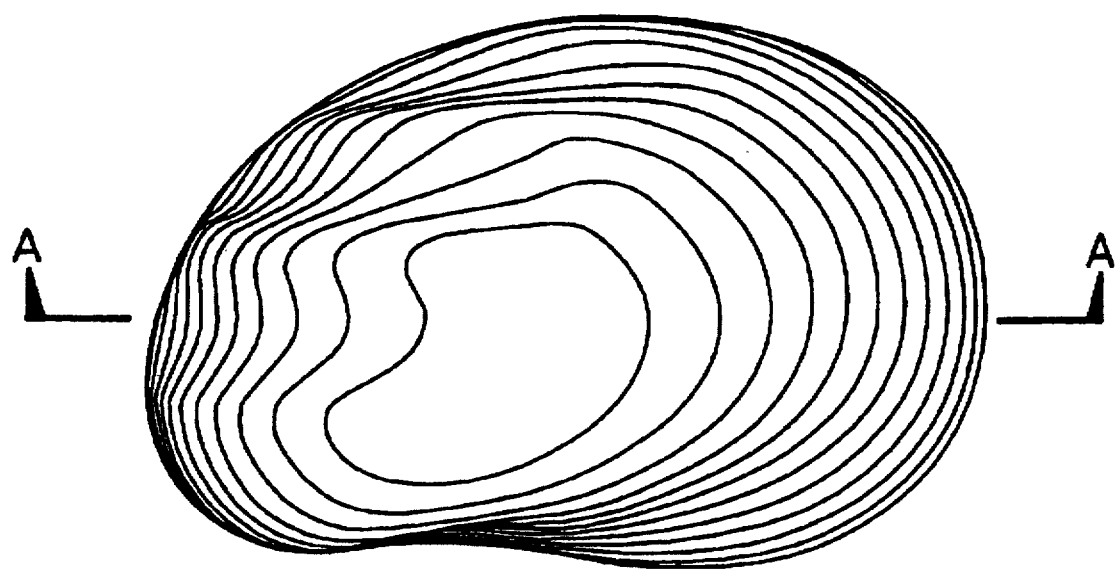
FIG. 25A is a plan view of a prior art mouse of Assmann illustrating elevational contour lines at intervals of ⅛"
Figure 25B:
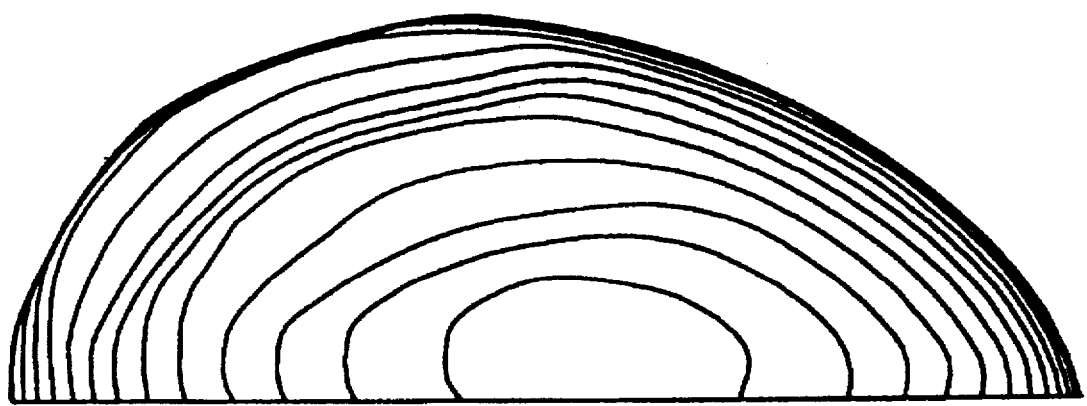
FIG. 25B is a cross-sectional view along line A—A of FIG. 25A showing equally spaced section lines taken every ⅛".

FIGS. 20, 21, and 22 illustrate the configuration of FIG. 15 with an indication of suitable slopes of the housing outer surface at various locations, as explained more fully below. The slopes should have a tolerance of ±4° and preferably ±1°. The slopes are given as angles of vectors having a direction as shown by the arrows and measured with respect to a surface on which the mouse housing is supported. Vectors which extend upwardly with respect to the supporting surface have a positive angle, and vectors which extend downwardly with respect to the supporting surface have a negative angle. Some of the vectors on the palm support area 22 are indicated by reference to the highest point 25 of the hump 24.

The configuration, contours, and slopes shown in FIGS. 13 through 22 are illustrative of a presently preferred embodiment of the invention. Departures can be made therefrom while still achieving the objects of the invention, as described more fully below.

Figure 18:
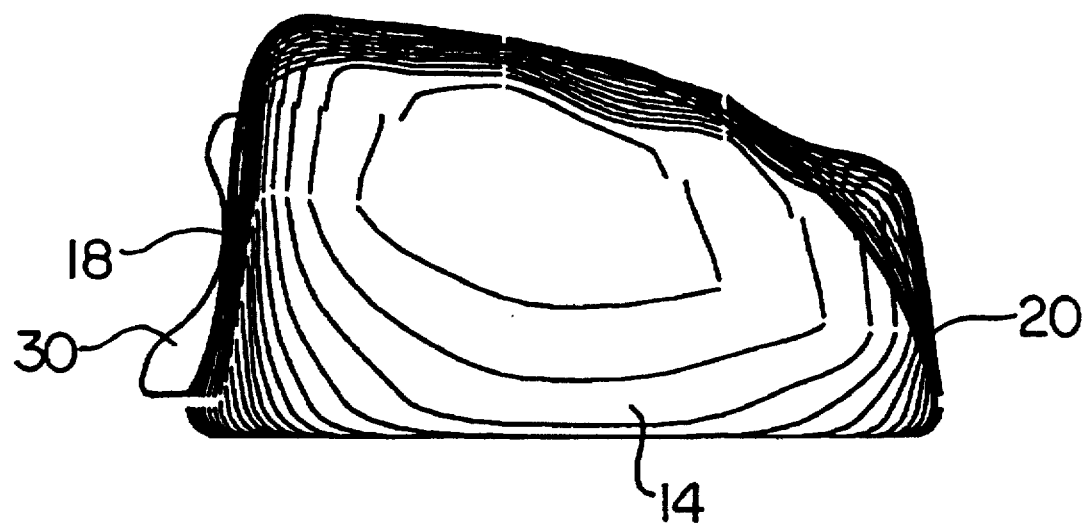
FIG. 18 is a sectional side view taken along line C—C of FIG. 15 showing equally spaced section lines taken every ⅛"

Referring now to FIGS. 1 through 7, the palm support area 22 comprises a surface having a generally rounded contour extending from the inner side 18 to the outer side 20. The portion of the surface which extends down to the inner side 18 has a greater slope than the portion of the surface which extends down to the outer side 20, best seen in FIG. 7. For example, as shown in FIG. 18, the slope of a vector on the surface extending down to the inner side is 69°, while vectors on the surface extending down to the outer side are 49°, 56°, and 65° respectively. The lesser slope to the outer side accommodates the natural tilt of the hand in the resting position on a level surface, whereby the metacarpalphalangeal joint at the first finger is held at a higher elevation off the surface than are the joints of the other fingers, with the elevations of the joints decreasing toward the joint of the little finger.

Figure 12:
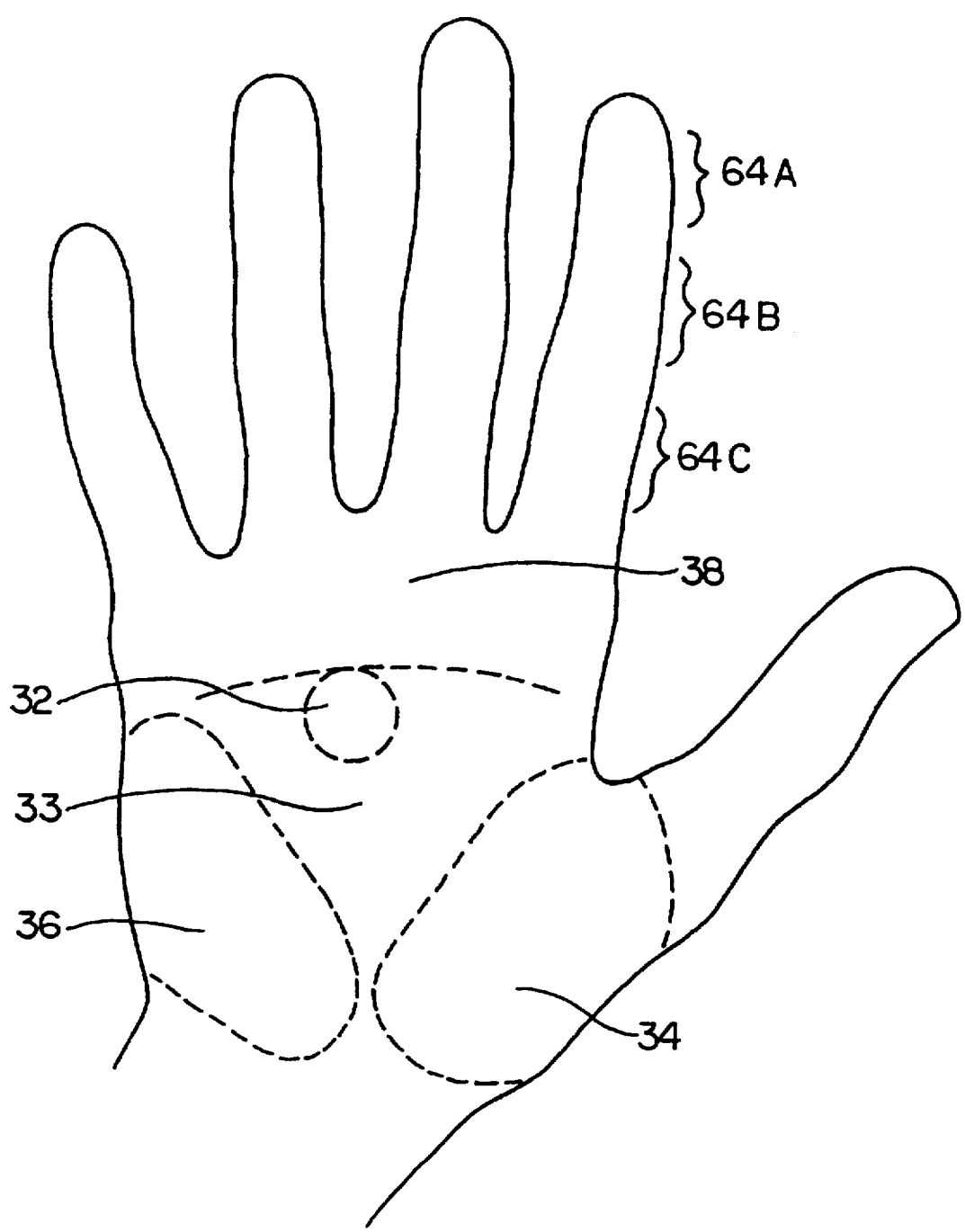
FIG. 12 is a schematic illustration of the regions of the hand.
Figure 13:
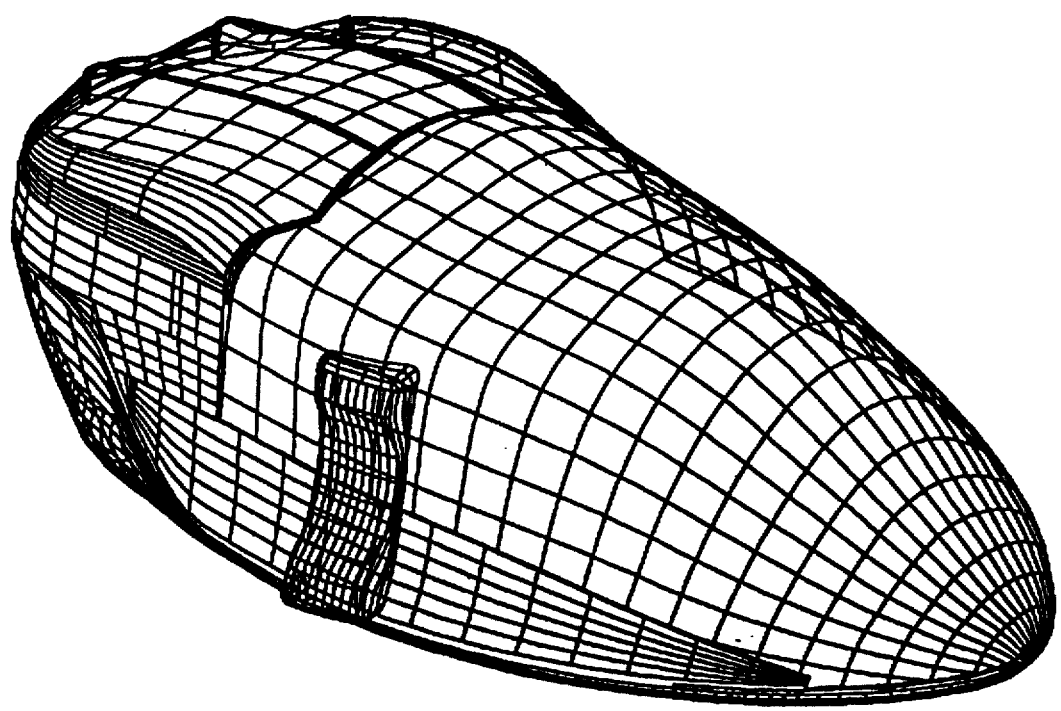
FIG. 13 is an isometric view of a mouse housing according to the present invention.

The hump 24 of the palm support area 22 comprises a raised region or bulge extending asymmetrically upwardly from the surface of the palm support area. The hump is located to be situated within an area 32 in the triangular area 33 encircled by the thenar region 34 and hyperthenar region 36 of the hand and the region 38 below the metacarpalphalangeal joints, as indicated in FIG. 12. The hump 24 provides more flexibility in holding the mouse by allowing pivoting of the hand about the hump.

Figure 7:
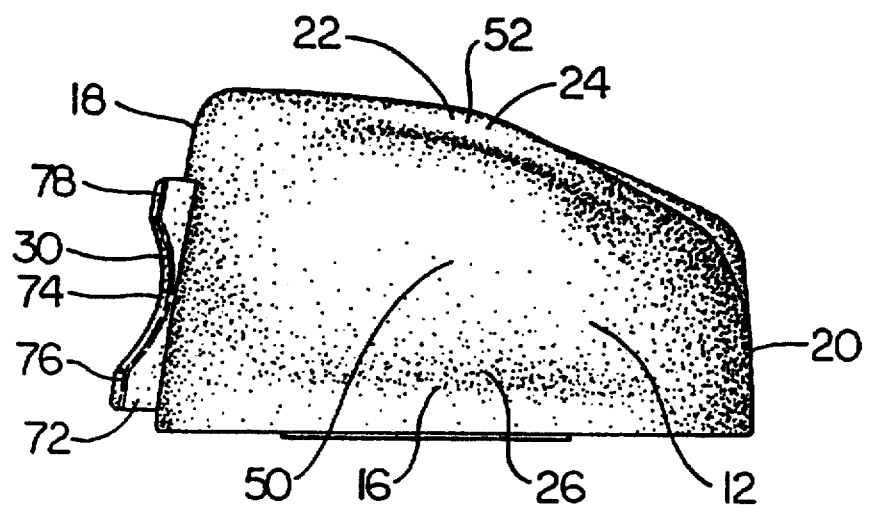
FIG. 7 is a back view of the mouse housing of FIG. 1.
Figure 19:
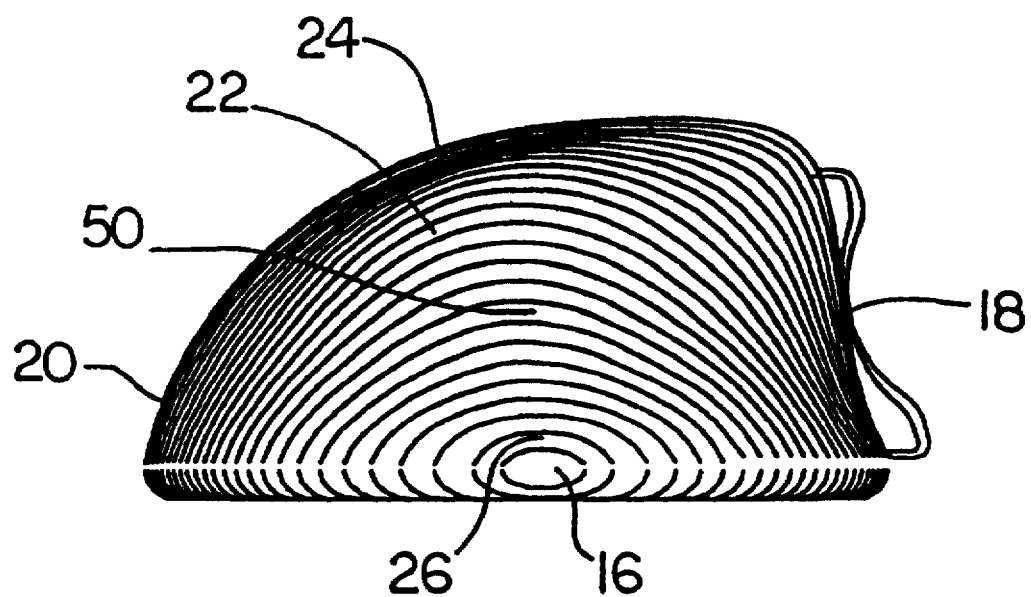
FIG. 19 is a sectional side view taken along line D—D of FIG. 15 showing equally spaced section lines taken every ⅛"

The hump 24 is more particularly described with reference to FIGS. 7 and 19, the contour plot of FIG. 14, and the slopes of FIGS. 20 and 21. The hump tapers off and blends into the rest of the surface of the palm support area 22 without creating any sharp edges or break lines. The hump is asymmetrically located on the housing with respect to an axis 40 extending longitudinally from the forwardmost point 42 at the front of the housing to the rearwardmost point 44 at the back of the housing. The hump is located on the side 20 of the axis closer to the outer side of the housing. Also, the curvature of the hump in a plane parallel to a work surface on which the housing is supported is greater on the outer side 18 than on the inner side 20 of the housing.

indicated by the greater curvature of the elevational contour lines on the outer side of the axis 40 of FIG. 14. This difference in curvature defines an asymmetrical bulge, that is, a bulge skewed toward the outer side of the housing. The asymmetry is also illustrated by the increasing angles of the vectors from the rear of the housing to the outer side of the hump; for example, FIG. 20 shows the angles increasing from 36° through 40°, 46°, to 49°.

Figure 1:
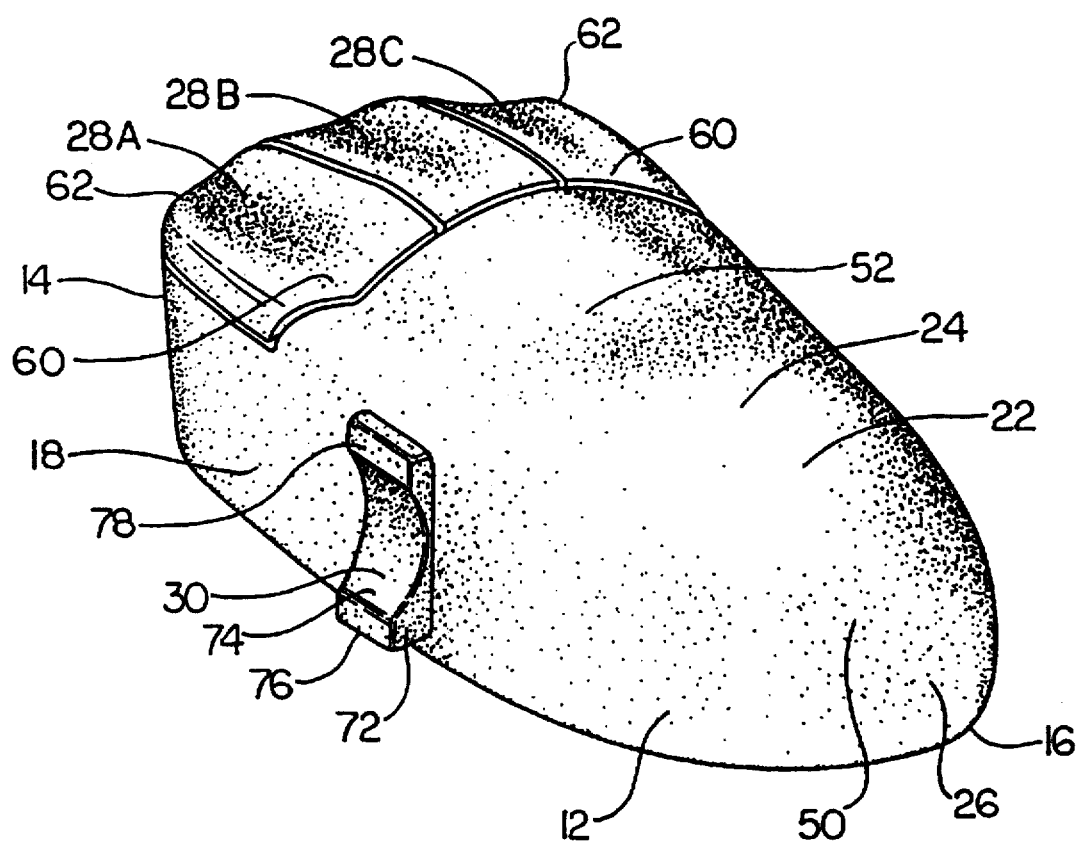
FIG. 1 is a perspective view of a mouse housing according to the present invention.
Figure 2:
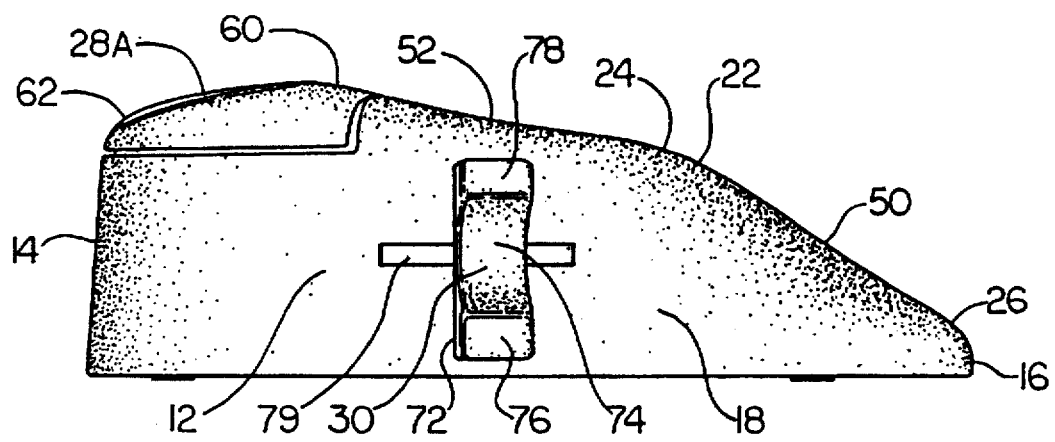
FIG. 2 is a side view of the mouse housing of FIG. 1.
Figure 3:
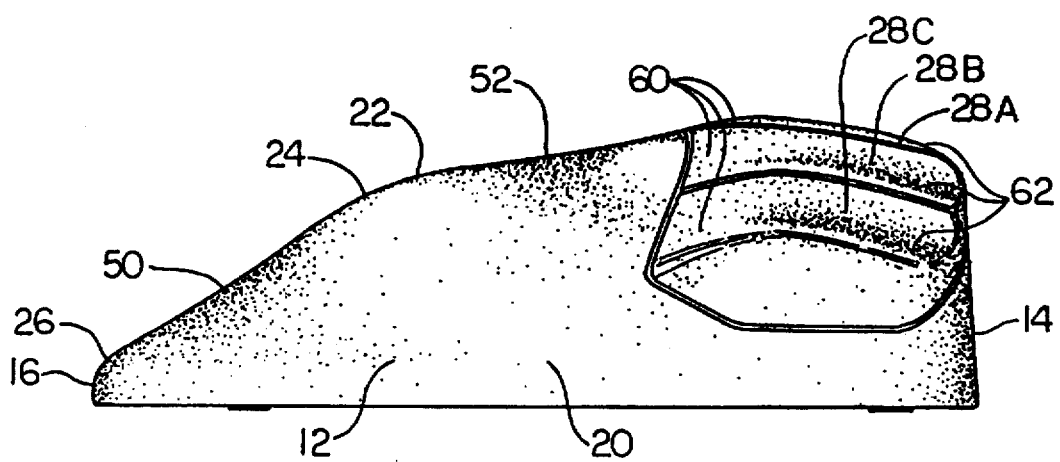
FIG. 3 is a further side view of the mouse housing of FIG. 1.
Figure 4:
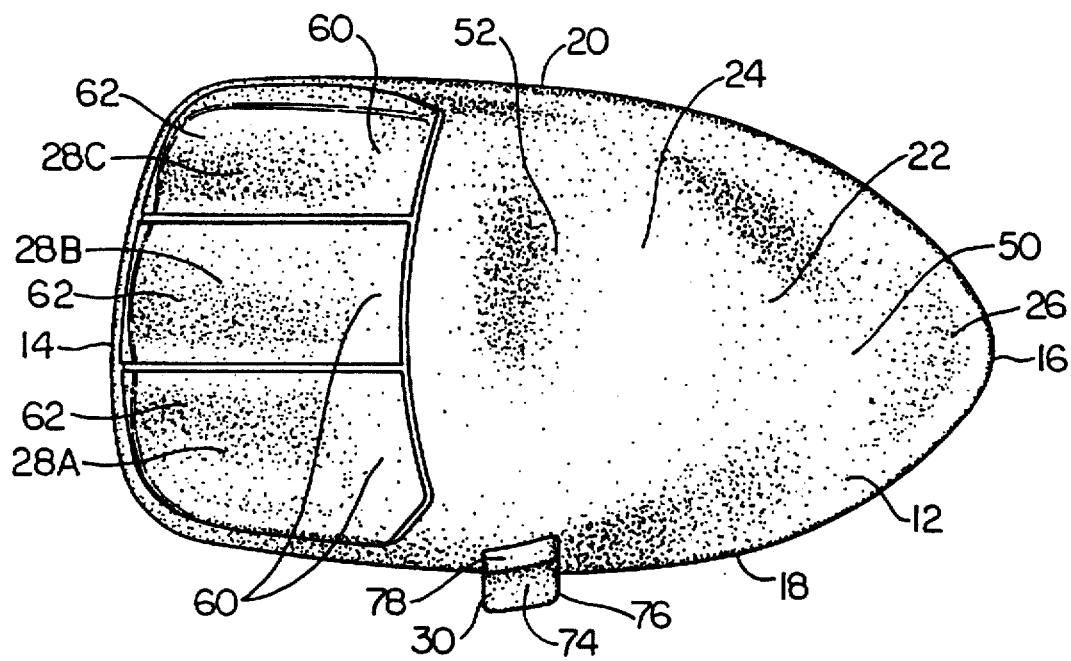
FIG. 4 is a top view of the mouse housing of FIG. 1.
Figure 5:
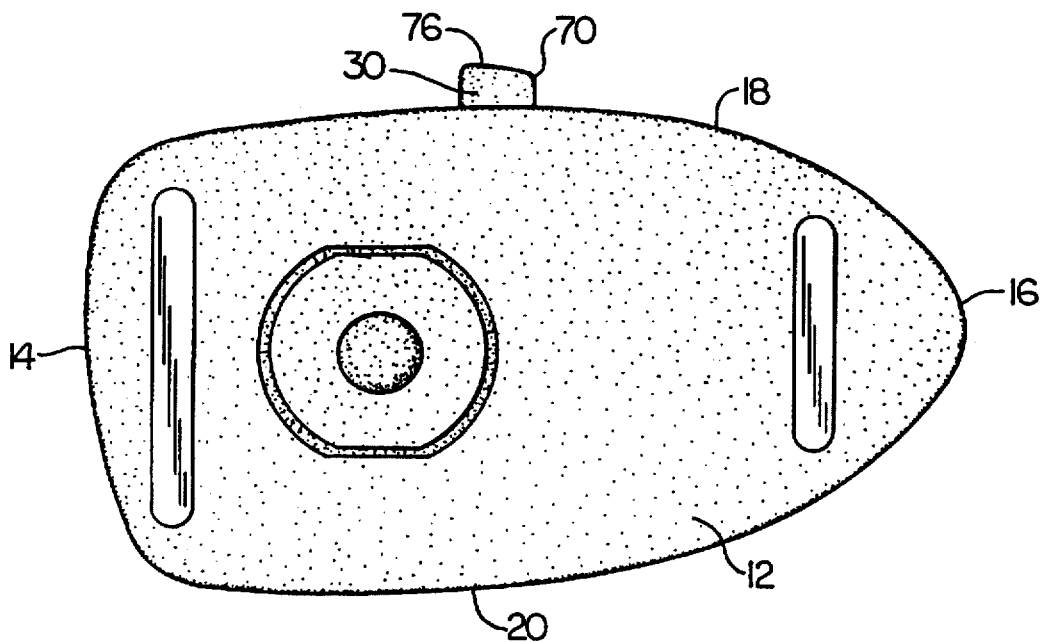
FIG. 5 is a bottom view of the mouse housing of FIG. 1.
Figure 6:
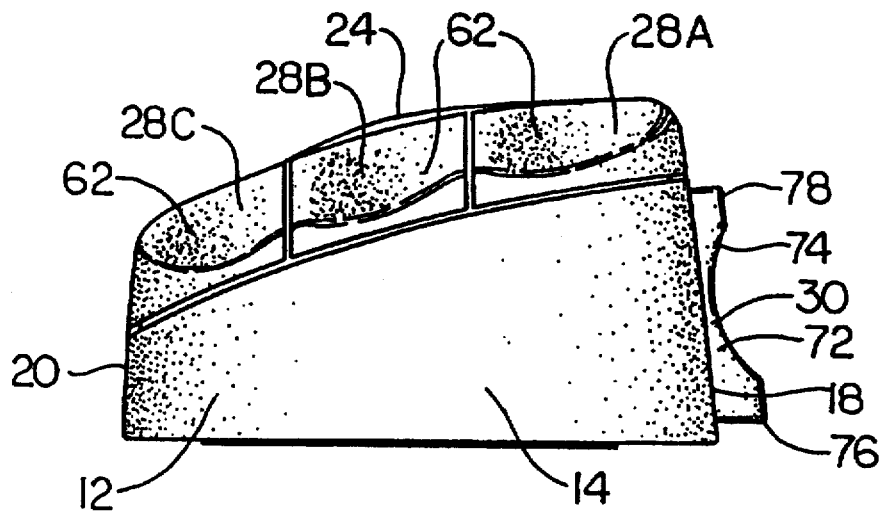
FIG. 6 is a front view of the mouse housing of FIG. 1.
Figure 16:
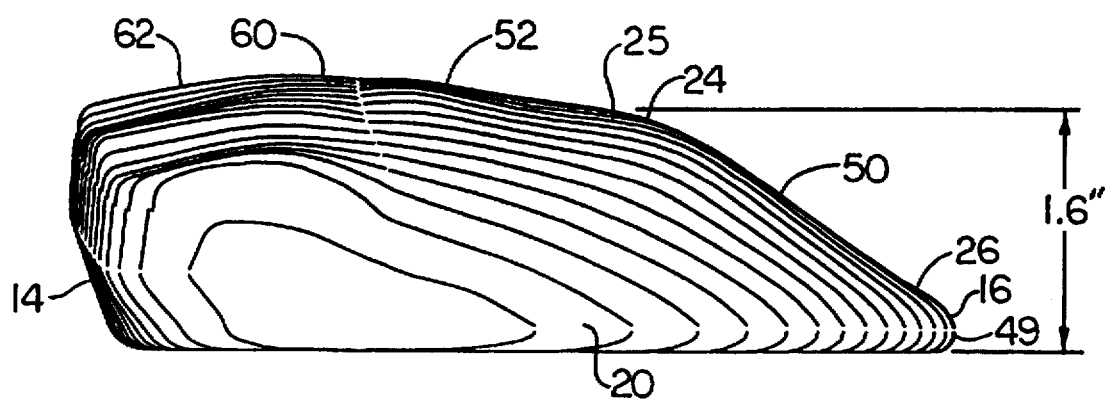
FIG. 16 is a sectional side view taken along line A—A of FIG. 15 showing equally spaced section lines taken every ⅛"
Figure 17:
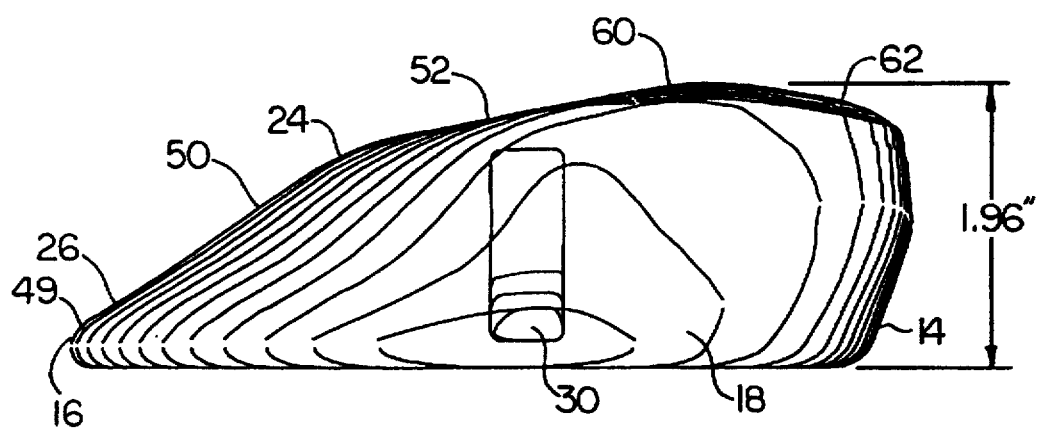
FIG. 17 is a sectional side view taken along line B—B of FIG. 15 showing equally spaced section lines taken every ⅛"

As seen in the side view of FIGS. 2 and 3 and the longitudinal cross-sectional view of FIGS. 16 and 17, the palm support area includes a rising portion 50 from the tail 26 to the hump 24 and a raised portion 52 forward of the hump. The raised portion 52 has a flatter slope than the rising portion 50. The hump is identified by the transition in the slope from the rising portion to the raised portion. Suitable slopes for the rising portion 50 and the raised portion 52 are illustrated in the cross-section of FIG. 21. As seen in the side view of FIG. 7 and the transverse cross-sectional view of FIG. 19 and as discussed above, the surface of the palm support area 22 tapers off from the hump 24 to the outer side 20 more gradually, that is, has a lesser slope, than the surface tapers off toward the inner side 18.

During the larger movements of the mouse, the hump bears the highest surface pressure over the contact surface between the hand and the mouse housing, by virtue of the hand's ability to pivot on the hump. During fine movements of the mouse, the thumb or little finger tend to bear on the inner side 18 or the outer side 20 of the housing respectively to move the housing over the work surface. The ability of the hand to switch between pivoting on the hump for larger motions and bearing on the sides for fine control prevents the hand from being held rigidly in one position, thereby reducing the static loading on the hand.

Figure 8:
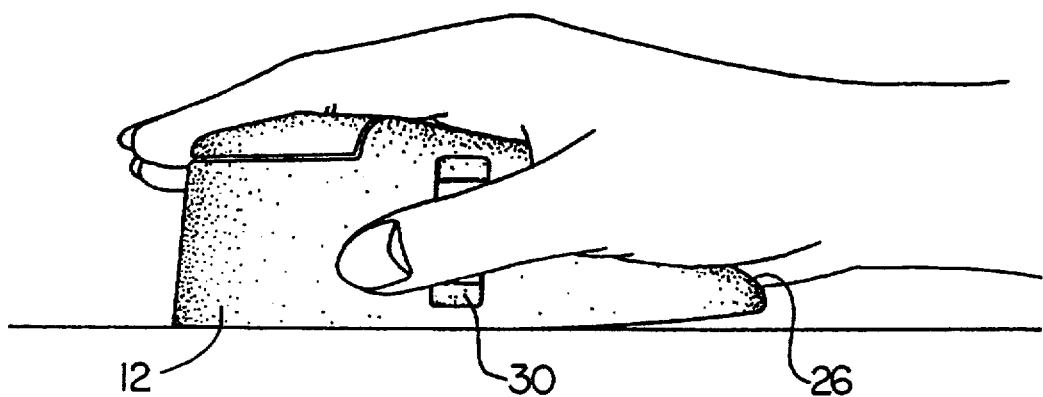
FIG. 8 is a side view of the mouse housing of FIG. 1 illustrating a hand position.
Figure 9:
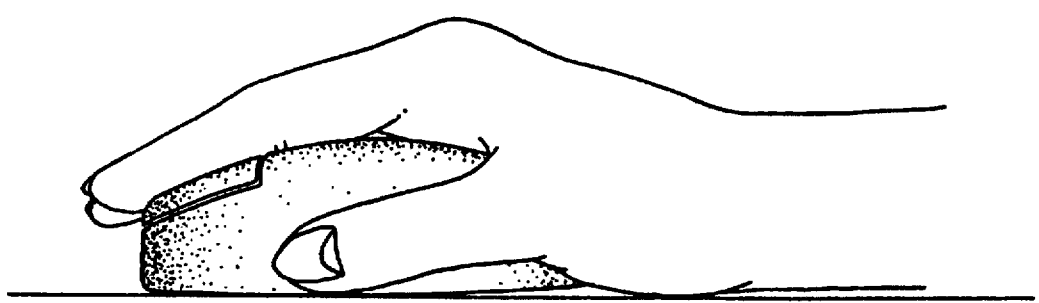
FIG. 9 is a side view of a prior art mouse housing illustrating a hand position.
Figure 11:
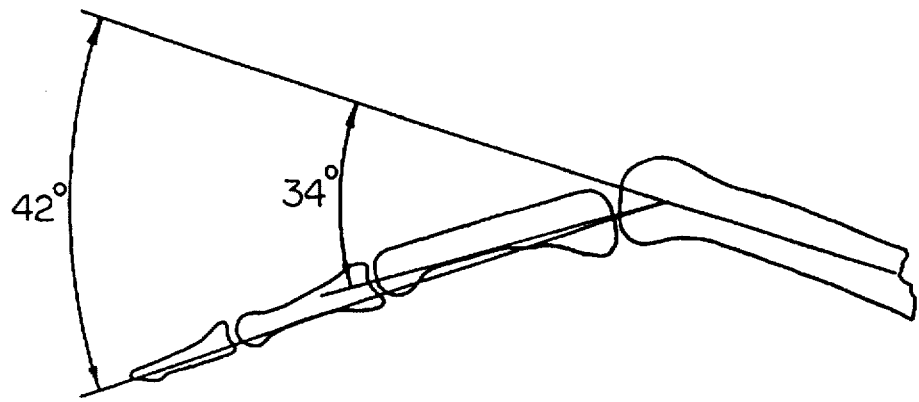
FIG. 11 is a schematic illustration of the hand bones illustrating the prior art hand position of FIG. 9.

The tail 26 is defined by a tapered extension of the surface of the palm support area 20 having a generally upraised wall which transitions smoothly to the base of the rising portion 50. The tail may include a slightly flattening at the base of the rising portion. The generally upraised wall tapers from the sides toward the back in plan view and forms a generally rounded point at the rearwardmost point 44 of the housing. The tail is generally in the line with the longitudinal axis 40 extending from the forwardmost point 42 to the rearmost point 44 of the housing. The base of the rising portion 50 is located at a sufficient distance from the hump 24 to underlie and bear the pressure of the region of the user's hand where the thenar and hyperthenar converge. For example, the distance between the top point 25 of the hump 24 and the rearwardmost point 44 may be 2.22"±0.25" for a large hand. The transition from the upraised wall to the rising portion is located at a height above the bottom surface of the housing a sufficient distance which, in combination with the height and location of the hump 24, serves to maintain the heel of the user's hand and the wrist off the work surface over which the mouse is moved, as seen in FIG. 8. In this manner, the tail tends to limit side-to-side movement of the wrist and to encourage greater use of the forearm muscles. Prior art mice, in contrast, allow a user's hand and wrist to rest on the work surface, as shown in FIG. 9.

Typically, three finger buttons 28A, 28B, 28C are provided, although any suitable number, such as one or two buttons, are contemplated by the invention. Generally, a first button 28A is operable by the index finger, a second button 28B is operable by the middle finger, and a third button 28C is operable by the ring finger. However, if less than three buttons are provided, preferably, the housing is contoured generally as if all three buttons were present, as discussed below.

Each button may be generally rectangular in plan view and includes a base 60, adjacent the palm support area, and a tip 62, which extends from the base to the front 14 of the mouse housing. Each button is circumferentially separated from the mouse housing and adjacent finger buttons. As is known in the art, the button is joined to the housing in a manner to allow each button to be depressed a slight distance in response to pressure from a user's finger. For example, a slightly flexible attachment member (not shown) may be secured to the underside of the button and to the underside of the housing. The attachment member flexes or gives slightly when the button is depressed. As is also known in the art, the underside of each button includes a depending member (not shown) for communication with an electrical switch, such that depression of the button by a user's finger causes operation of the switch. It will be appreciated that any suitable manner of attaching the button to the housing and to an electrical switch can be provided to cause operation of the switch upon depression of the button.

At least one finger button, and preferably a second finger button if more than one are provided, is elevated in relation to the hump such that the base 60 of the button is higher than the top point 25 of the hump 24 when the housing is supported on a level surface. Additionally, the base of the index finger button 28A is higher than the base of the middle finger button 28B, which in turn is higher than the base of the ring finger button 28C. This decrease in elevation accommodates the natural tilt of the hand, discussed above.

The length of the buttons, including the base 60 and the tip 62, is elongated sufficiently to ensure that the second and third sections of each finger may contact the surface of the button. In addition, the base 60 of each button is angled upwardly with respect to the plane of the work surface, and the tip 62 of each button is angled downwardly. Suitable angles are illustrated in FIG. 20. In this manner, the base of the button underlies and contacts the second section of the finger closer to the joint between the bones of the first row 64C and the second row 64B than to the joint between the bones of the second row 64B and the third row 64A. (See FIG. 12.) This contact region tends to distribute the loading to more muscles. The tip of the ring finger button, if present, should be angled downwardly at a larger angle than the index and middle finger buttons, as best seen in FIG. 16 and illustrated by the slopes given in FIG. 18.

Figure 10:
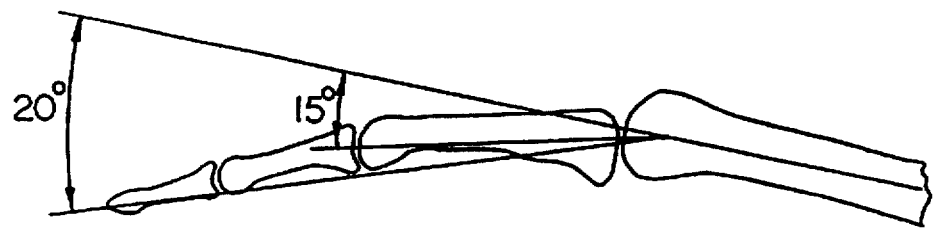
FIG. 10 is a schematic illustration of the hand bones illustrating the hand position of FIG. 8.

Referring to FIG. 10, a preferred embodiment of the mouse housing of the present invention is configured to support each finger with a lesser angle at the metacarpalphalangeal joint than are prior art mouse housings. For example, for the hand illustrated in FIG. 10, the metacarpalphalangeal joint makes an angle of about 15° with respect to the first phalanx 64C of the finger and an angle of about 20° with respect to the third phalanx 64A of the finger. The present housing configuration also encourages laying of the finger phalangeal sections across each button, rather than placing the tip of the finger on the button. In prior art mice, the buttons are lower with respect to the palm area and are angled downwardly such that the metacarpalphalangeal joint makes a greater angle. For example, the same hand resting on a Microsoft mouse model no. V2.0 makes angles of 34° and 42° respectively at the metacarpalphalangeal joint. The greater angles of prior art mice are believed to employ different muscles than are employed by the mouse of the present invention.

The thumb support 30 comprises an element 72 extending from the side of the mouse housing and located to support the first or second phalange of the thumb. The support element has a concave surface 74 terminating at a lower support 76 for supporting the outer or lower side of the user's thumb. This lower support serves as a rest for the thumb during use. The concave surface also terminates at an upper support 78 for supporting an inner or upper side of the thumb during lifting of the mouse.

The outer side 20 of the housing 12 ends forms a substantially straight wall, against which the user's little finger may rest. In operation during lifting of the mouse sensing mechanism off the work surface, a user may tilt the housing about the edge of the outer side 20 simply by lifting up on the upper support 78 of the thumb support 30. In this manner, the little finger of the user's hand serves as a guide during tilting and "brake" during movement of the mouse. The lower edge of the outer side may be beveled or rounded to better accommodate tilting of the housing during lifting.

In addition, the thumb support may also comprise a switch for activating other functions, if desired. Preferably, the switch is configured to pivot about a point inside the mouse housing. The switch can be a two-state switch, such that pressing up on the upper support 78 activates a desired function and pressing down on the lower support 76 activates another desired function. Advantageously, the switch can be configured to disengage the mouse from the computer by pressing up on the upper support 78 or down on the lower support 76, for example, to reposition the mouse on the work surface. In this case, the activation pressure for the switch is preferably selected so that the switch can be activated to disengage the mouse without lifting the housing off the work surface.

In a further modification, the thumb support 30 may be removable, for example, to accommodate thumbs of different sizes. In this case, a slot may be provided in the mouse housing. The thumb support may slip into the slot and be retained therein in any suitable manner, such as by extending tabs which mate with cooperative recesses formed adjacent the slot on the interior wall of the housing. Additionally, the thumb support may be adjustable in a horizontal plane, for example by sliding along a slot 79. Preferably, the thumb support is located on the housing to support the thumb in the region between the nail and the joint. An adjustable thumb support allows a user to move the thumb support to a suitable location.

Manufacturers of prior art mice provide only a single size for all users. However, the hands of users vary widely in size. Most mice are too small for medium or large hands, such that a user with a medium or large hand tends to flex the fingers to bring the finger tips onto the mouse buttons. Users also tend to lift the palm off the palm area of the mouse housing of prior art mice.

The present invention contemplates providing the mouse housing in various sizes to accommodate the different sizes of hands. Generally, three sizes have been found sufficient to accommodate most hand sizes. For each size, the various aspects of the mouse as discussed above may be provided. The housing is merely scaled to the appropriate size in the X, Y, and Z directions shown by the axes in FIG. 20. As an example for purposes of the present invention, large hands are at least 7½" from the crease at the wrist to the tip of the middle finger. Medium hands range between 6¾" to 7½". Small hands range between 6" and 6¾". The scale factors are given as a percentage of the dimensions of a large mouse such as that shown in FIG. 20 in the X, Y, and Z directions. The scale factors for a medium mouse are 94% in the X direction, 92% in the Y direction, and 92% in the Z direction. The scale factors for a small mouse are 89% in the X direction, 87% in the Y direction, and 87% in the Z direction.

Larger or smaller sizes can be provided in accordance with the present invention by choosing appropriate scale factors, such as, for example, to provide a mouse for a child's hand.

In another aspect of the present invention, an aperture 80 for a wire 82 which connects the mouse to a computer is provided in the housing at an elevated location at the front 14 of the housing. In this manner, the wire does not drag on the work surface as the mouse is moved thereover, thereby easing movement of the mouse by the user. The wire should be elevated at least ⅝" above the work surface. Preferably, the center line of the wire should be at least ⅞" above the work surface.

The invention is not to be limited by what has been particularly shown and described, except as indicated by the appended claims.

We claim:

1. A housing for a mouse computer input device comprising:
   a shell having a palm support area and at least one finger button, the button having an upper surface comprising a base proximate to the palm support area and a tip distal from the palm support area, the base being angled upwardly away from the palm support area with respect to a plane of a work surface on which the housing is supportable, and the tip of the button being angled downwardly away from the base with respect to the plane of the work surface.

2. The housing of claim 1, wherein the base of the button is elevated with respect to the plane of the work surface to an elevation greater than the elevation of the palm support area.

3. The housing of claim 1, wherein the base is angled upwardly at least 3.5°±3° with respect to the plane of the work surface on which the housing is supportable.

4. The housing of claim 1, wherein the base is angled upwardly generally 5.5°±4° with respect to the plane of the work surface on which the housing is supportable.

5. The housing of claim 1, wherein the tip is angled downwardly generally 10°±4°.

6. The housing of claim 1, further comprising a plurality of finger buttons, each button having a base and a tip, each base of each button being angled upwardly with respect to the plane of the work surface, and each tip of each button being angled downwardly with respect to the plane of the work surface.

7. The housing of claim 6, wherein the elevation of the base of each finger button decreases from an inner side of the housing to an outer side.

8. The housing of claim 1, further comprising three finger buttons, a tip of a third finger button at an outer side of the housing being angled downwardly at a larger angle than a tip of a first finger button.

9. The housing of claim 8, wherein a base of the first finger button is angled upwardly generally 5.5°±4° with respect to the plane of the work surface, a base of the second finger button is angled upwardly generally 3.5°±3° with respect to the plane of the work surface, and a base of the third finger button is angled upwardly generally 9.5°±4° with respect to the plane of the work surface.

10. The housing of claim 1, wherein the finger button has a length sufficient to provide contact of the second section and third section of a finger with a surface of the button and with the base of the button contacting the second section of the finger at a point closer to the joint between the bones of the first and second rows than to the joint between the bones of the second and third rows.

11. A housing for a mouse computer input device comprising:

a shell having a palm support area and at least one finger button;

the palm support area comprising a surface having a generally rounded contour, and a hump extending from the generally rounded contour and located to support a central area of a user's palm; and the button having an upper surface comprising a base adjacent the palm support area and a tip distal from the palm support area, the base being angled upwardly away from the palm support area with respect to a plane of a work surface on which the housing is supportable to a region at a higher elevation than the hump, the tip of the button being angled downwardly from the region and away from the base with respect to the plane of the work surface.

12. A housing for a mouse computer input device comprising:

a shell having a palm support area, at least one finger button, and a thumb support comprising a concave element located on a side of the shell, a lower portion of the concave element comprising a lower surface for resting a user's thumb, wherein the thumb support comprises a switch including two actuatable states, one state actuatable upon sufficient preselected pressure by the thumb on the lower surface, another state actuatable upon sufficient preselected pressure by the thumb on an upper surface of the concave element.

13. A housing for a mouse computer input device comprising:

a shell having a palm support area, at least one finger button, and a thumb support comprising a concave element located on a side of the shell, a lower portion of the concave element comprising a lower surface for resting a user's thumb, wherein the thumb support comprises a switch and an upper surface on the concave element of the thumb support comprises a switch actuator in communication with a pressure actuatable switch element configured to disengage a mouse from a computer upon actuation of the switch.

14. The housing of claim 13, wherein the pressure actuatable switch is adjusted to actuate upon pressure on the upper surface which is insufficient to lift the housing off of a work surface.

15. A housing for a mouse computer input device comprising:

a shell having a palm support area, at least one finger button, and a thumb support comprising a concave element located on a side of the shell, a lower portion of the concave element comprising a lower surface for resting a user's thumb, wherein the thumb support comprises a switch and the lower portion on the concave element of the thumb support comprises a switch actuator in communication with a pressure actuatable switch element configured to disengage a mouse from a computer upon actuation of the switch.

16. A housing for a mouse computer input device comprising:

a shell having a palm support area, at least one finger button, and a thumb support comprising a concave element located on a side of the shell, a lower portion of the concave element comprising a lower surface for resting a user's thumb, wherein the thumb support comprises a removable member.

17. A housing for a mouse computer input device comprising:

a shell having a palm support area, at least one finger button, and a thumb support comprising a concave element located on a side of the shell, a lower portion of the concave element comprising a lower surface for resting a user's thumb, wherein the thumb support comprises a horizontally adjustable member.

18. A housing for a mouse computer input device comprising:

a shell having a palm support area and at least one finger button;

the palm support area comprising:

a surface having a rounded contour extending from an inner side to an outer side, a hump located in a midregion of the surface and comprising an asymmetrical bulge extending from the rounded contour of the surface with a rearwardly and outwardly facing region having a greater curvature in a plane parallel to a work surface on which the housing is supported than a rearwardly and inwardly facing region, an outer portion of the surface extending from the hump downwardly toward the outer side, and an inner portion of the surface extending from the hump downwardly toward the inner side at a greater slope than the outer portion, and a tail, lower than the hump, comprising a tapering of the palm support area along the inner side and the outer side to a point at the back of the shell; and the finger button comprising a base and a tip, the base being angled upwardly with respect to a plane of a work surface on which the housing is supportable and being elevated at a higher elevation than the hump with respect to the work surface.

19. A housing for a mouse computer input device comprising:

a shell having a palm support area, at least one finger button, and a thumb support;

the palm support area comprising:

a surface having a rounded contour extending from an inner side to an outer side, a hump located in a midregion of the surface and comprising an asymmetrical bulge extending from the rounded contour of the surface with a rearwardly and outwardly facing region having a greater curvature in a plane parallel to a work surface on which the housing is supported than a rearwardly and inwardly facing region, an outer portion of the surface extending from the hump downwardly toward the outer side, and an inner portion of the surface extending from the hump downwardly toward the inner side at a greater slope than the outer portion, and a tail, lower than the hump, comprising a tapering of the palm support area along the inner side and the outer side to a point at the back of the shell;

the finger button comprising a base and a tip, the base being angled upwardly with respect to a plane of a work surface on which the housing is supportable and being elevated at a higher elevation than the hump with respect to the work surface; and the thumb support comprising a concave element located on a side of the shell, a lower portion of the concave element comprising a lower surface for resting a user's thumb.

20. A housing for a mouse computer input device comprising:

a shell having a palm support area and three finger buttons, an outermost of the three buttons being disposed at a lowest elevation with respect to a work surface on which the housing is supportable, the outermost button having an upper surface comprising a base surface proximate to the palm support area and a tip surface distal from the palm support area, the base surface being angled upwardly away from the palm support area with respect to a plane of the work surface on which the housing is supportable, and the tip surface of the button being angled downwardly away from the base surface with respect to the plane of the work surface at a greater angle than the base surface is angled upwardly from the palm support area.

21. The housing of claim 20, wherein the base surface of the outermost finger button is angled upwardly away from the palm support area with respect to a plane of the work surface on which the housing is supportable.

22. The housing of claim 20, wherein the outermost finger button includes an upcurved outer edge.

23. The housing of claim 20, wherein an innermost of the three finger buttons includes a tip surface angled downwardly away from the palm support area with respect to the work surface at a smaller angle than the angle of the tip surface of the outermost button.

* * * * *